United States Patent
Tsuji

(10) Patent No.: US 8,253,110 B2
(45) Date of Patent: Aug. 28, 2012

(54) RADIATION IMAGE PROCESSING APPARATUS

(75) Inventor: Tetsuya Tsuji, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/075,830

(22) Filed: Mar. 30, 2011

(65) Prior Publication Data

US 2011/0240873 A1    Oct. 6, 2011

(30) Foreign Application Priority Data

Mar. 31, 2010 (JP) ................................. 2010-080999

(51) Int. Cl.
*G01T 1/24* (2006.01)
(52) U.S. Cl. ................................................. 250/370.08
(58) Field of Classification Search ............. 250/370.01, 250/370.08, 370.09, 394
See application file for complete search history.

(56) References Cited

U.S. PATENT DOCUMENTS 7,822,179 B2    10/2010    Tsuji

*Primary Examiner* — Mark R Gaworecki
(74) *Attorney, Agent, or Firm* — Sughrue Mion, PLLC

(57) ABSTRACT

On control charge information, which is obtained from an on-controlled detection element, is acquired with respect to each of the detection elements of a radiation detector, and off control charge information, which corresponds to the on-controlled detection element, is acquired with respect to each of predetermined detection element intervals. Element interpolated off control charge information representing the off control charge information having not been acquired is formed by performing an interpolating operation in accordance with the off control charge information having been acquired with respect to each of the predetermined detection element intervals. The on control charge information is corrected with the corresponding off control charge information or the corresponding element interpolated off control charge information.

4 Claims, 4 Drawing Sheets

RADIATION IMAGE PROCESSING APPARATUS

BACKGROUND OF THE INVENTION

1. Field of the Invention

This invention relates to a radiation image processing apparatus for detecting radiation by a radiation detector and thereby acquiring a radiation image. This invention particularly relates to correction with respect to an artifact occurring in accordance with leak electric charges.

2. Description of the Related Art

For example, in the medical field, there have heretofore been widely used radiation image processing apparatuses, wherein radiation is irradiated from a radiation source toward an object (a patient), wherein the radiation carrying image information of the object is detected by a radiation detector, wherein the thus detected image information is processed, and wherein radiation image information of the object is thereby acquired. The thus acquired radiation image information is displayed on a display device and utilizing for making a diagnosis, and the like.

FIG. 2 is a schematic view showing a constitution of a radiation detector employed in a radiation image processing apparatus. With reference to FIG. 2, a radiation detector 2 is provided with a plurality of detection elements 11 to 55, which are arrayed in a matrix-like form. Each of the plurality of the detection elements 11 to 55 comprises a thin film transistor (TFT) acting as a signal readout switch. Also, a film of amorphous selenium (a-Se), or the like, is formed by vacuum evaporation on the detection elements 11 to 55.

Gate lines 4a to 4e, each of which is selected by a gate driver circuit 3, and signal lines 6a to 6e, each of which is selected by a signal readout circuit 5, are connected to the corresponding detection elements among the detection elements 11 to 55. In accordance with control signals given by a readout control circuit 7, one of the gate lines 4a to 4e is selected by the gate driver circuit 3, and one of the signal lines 6a to 6e is selected by the signal readout circuit 5. One of the detection elements 11 to 55 is thus specified, and electric charge information having been accumulated in the specified detection element is thus read out.

FIG. 3 shows an equivalent circuit of each of the detection elements 11 to 55. Each of the detection elements 11 to 55 comprises a corresponding region of a common electrode 8, to which a bias voltage is applied from an electric power source B. Each of the detection elements 11 to 55 also comprises a corresponding region of a conversion layer 9 for converting radiation X into electric charge signal component. The conversion layer 9 is constituted of a-Se, or the like. Each of the detection elements 11 to 55 further comprises a pixel electrode 10 for collecting electric charges generated in the corresponding region of the conversion layer 9. Each of the detection elements 11 to 55 still further comprises a storage capacitor C for storing the electric charges having been collected by the pixel electrode 10. Each of the detection elements 11 to 55 also comprises a transistor switch Tr for outputting the electric charge information, which has been stored by the storage capacitor C, to an external circuit. The storage capacitor C is connected to a source terminal of the transistor switch Tr. Also, a corresponding gate line among the gate lines 4a to 4e is connected to a gate terminal of the transistor switch Tr. Further, a corresponding signal line among the signal lines 6a to 6e is connected to a drain terminal of the transistor switch Tr.

In cases where an excessive dose of the radiation X is irradiated to the radiation detector 2, and a large quantity of the electric charges are stored in the storage capacitor C at the time at which the transistor switch Tr is in the off state, there is the risk that the voltage across the drain terminal and the source terminal will increase excessively, and that the transistor switch Tr will thus be broken down.

Therefore, the radiation detector 2 is set so as to apply the bias voltage of a negative voltage from the electric power source B to the common electrode 8, such that the polarity (negative voltage) identical with the direction of transition of a control voltage at the time, at which the transistor switch Tr is set from the on state to the off state, is set. In such cases, at the time, at which a voltage Vs of the storage capacitor C has fallen toward the negative voltage side as a result of the irradiation of the radiation X and has become lower than a gate voltage Vg having been set at a negative voltage, the transistor switch Tr is forcibly turned on, and the electric charges having been stored in the storage capacitor C are discharged. As a result, the breakdown of the transistor switch Tr is avoided.

In cases where the radiation detector 2 is constituted in the manner described above, if the period of time having elapsed between the finish of the irradiation of the radiation X and the beginning of the readout is short at the time at which the electric charge information is read out from each of the detection elements 11 to 55 by use of the signal readout circuit 5, the problems described below will occur. Specifically, at the time at which the transistor switch Tr is forcibly turned on due to the irradiation of an excessive dose of the radiation X to the radiation detector 2, an inappropriate artifact arises in the acquired radiation image due to adverse effects of leak electric charges discharged from each of the detection elements 11 to 55.

In order to eliminate the problems described above, the applicant proposed, in U.S. Pat. No. 7,822,179, an apparatus enabling the acquisition of an appropriate radiation image signal free from an artifact due to leak electric charges. The proposed apparatus comprises: (a) acquiring both of on control electric charge information (a signal value representing electric charge information and leak electric charges superimposed one upon the other), which is outputted at the time of on control, and off control electric charge information (a signal value representing the leak electric charges alone), which is outputted at the time of off control, with respect to each of the gate lines 4a to 4e at the time at which the electric charge information is read out from each of the detection elements 11 to 55 in the order of the gate lines 4a to 4e, and (b) making correction by subtracting the off control electric charge information, which represents the leak electric charges obtained at the time of the off control of each of the detection elements 11 to 55, from the on control electric charge information having been read out from the corresponding detection element.

However, with the apparatus proposed in U.S. Pat. No. 7,822,179, in order for the artifact due to the leak electric charges to be corrected, it is necessary to acquire the two kinds of the signal components, i.e. the on control electric charge information and the off control electric charge information, with respect to each of the detection elements. Therefore, the required signal readout time becomes two times as long as the signal readout time which is required in cases where the correction of the artifact is not performed. Accordingly, at the time of the imaging operations for acquiring a dynamic image, the problems occur in that the frame rate becomes low. Also, at the time of tomosynthesis imaging operations, the problems occur in that the period of time required before the imaging operations are completed, i.e. the period of time during which the patient is constrained for the imaging operations, becomes long.

Therefore, there is a strong demand for an apparatus, which enables a radiation image signal to be acquired quickly in cases where the artifact due to the leak electric charges is corrected.

SUMMARY OF THE INVENTION

The primary object of the present invention is to provide a radiation image processing apparatus, wherein a correction is made for an artifact due to lead electric charges, and wherein a radiation image signal is acquired quickly.

The present invention provides a first radiation image processing apparatus, comprising:

i) a radiation detector, which comprises a plurality of detection elements arrayed in a two-dimensional form, each of the detection elements being provided with a storage capacitor for storing electric charge information in accordance with a radiation dose irradiated to the detection element, the radiation detector operating such that readout on-off control is performed with respect to each of rows in the array of the detection elements, and such that the electric charge information is read out through an identical signal line with respect to each of columns in the array of the detection elements, ii) a driver circuit for performing the readout on-off control with respect to each of the rows in the array of the detection elements, iii) a readout circuit for reading out a signal component having been outputted through the signal line with respect to each of the columns in the array of the detection elements, iv) control means for controlling the driver circuit and the readout circuit, such that on control electric charge information, which is obtained from an on-controlled detection element, is acquired with respect to each of the detection elements, and such that off control electric charge information, which corresponds to the on-controlled detection element, is acquired with respect to each of predetermined detection element intervals, and v) a correction circuit for:

forming element interpolated off control electric charge information representing the off control electric charge information, which has not been acquired during the readout operation, and which is obtained by performing an interpolating operation in accordance with the off control electric charge information having been acquired with respect to each of the predetermined detection element intervals, and correcting the on control electric charge information with the corresponding off control electric charge information or the corresponding element interpolated off control electric charge information.

The first radiation image processing apparatus in accordance with the present invention should preferably be modified such that the correction circuit performs smoothing processing on the off control electric charge information and the element interpolated off control electric charge information and corrects the on control electric charge information with the smoothed off control electric charge information, which has been subjected to the smoothing processing, or the smoothed element interpolated off control electric charge information, which has been subjected to the smoothing processing.

The present invention also provides a second radiation image processing apparatus, comprising:

i) a radiation detector, which comprises a plurality of detection elements arrayed in a two-dimensional form, each of the detection elements being provided with a storage capacitor for storing electric charge information in accordance with a radiation dose irradiated to the detection element, the radiation detector operating such that readout on-off control is performed with respect to each of rows in the array of the detection elements, and such that the electric charge information is read out through an identical signal line with respect to each of columns in the array of the detection elements, ii) a driver circuit for performing the readout on-off control with respect to each of the rows in the array of the detection elements, iii) a readout circuit for reading out a signal component having been outputted through the signal line with respect to each of the columns in the array of the detection elements, iv) control means for controlling the driver circuit and the readout circuit at the time of continuous imaging operations performed over a plurality of frames, such that on control electric charge information, which is obtained from an on-controlled detection element, is acquired with respect to each of the frames, and such that off control electric charge information, which corresponds to the on-controlled detection element, is acquired with respect to each of predetermined frame intervals, and v) a correction circuit for:

forming frame interpolated off control electric charge information representing the off control electric charge information, which has not been acquired during the readout operation, and which is obtained by performing an interpolating operation in accordance with the off control electric charge information having been acquired with respect to each of the predetermined frame intervals, and correcting the on control electric charge information with the corresponding off control electric charge information or the corresponding frame interpolated off control electric charge information.

The second radiation image processing apparatus in accordance with the present invention should preferably be modified such that the correction circuit performs smoothing processing on the off control electric charge information and the frame interpolated off control electric charge information and corrects the on control electric charge information with the smoothed off control electric charge information, which has been subjected to the smoothing processing, or the smoothed frame interpolated off control electric charge information, which has been subjected to the smoothing processing.

With the first radiation image processing apparatus in accordance with the present invention, the signal component is read out from the radiation detector, which comprises the plurality of the detection elements arrayed in the two-dimensional form, each of the detection elements being provided with the storage capacitor for storing the electric charge information in accordance with the radiation dose irradiated to the detection element, the radiation detector operating such that the readout on-off control is performed with respect to each of the rows in the array of the detection elements, and such that the electric charge information is read out through the identical signal line with respect to each of the columns in the array of the detection elements. At the time of the readout of the signal component, the on control electric charge information, which is obtained from the on-controlled detection element, is acquired with respect to each of the detection elements, and the off control electric charge information, which corresponds to the on-controlled detection element, is acquired by being thinned out with respect to each of the predetermined detection element intervals. The correction circuit forms the element interpolated off control electric charge information representing the off control electric charge information, which has not been acquired during the readout operation, and which is obtained by performing the interpolating operation in accordance with the off control electric charge information having been acquired with respect to each of the predetermined detection element intervals. Also, the correction circuit corrects the on control electric charge information with the corresponding off control electric charge information or the corresponding element interpolated off control electric charge information. Therefore, the first radiation image processing apparatus in accordance with the present invention has the advantages over the conventional apparatus, in which the off control electric charge information is read out with respect to each of all detection elements, in that the period of time required for reading out the off control electric charge information becomes short to the extent of the thinning-out acquisition, and in that the radiation image signal is therefore acquired quickly.

With the modification of the first radiation image processing apparatus in accordance with the present invention, the correction circuit performs the smoothing processing on the off control electric charge information and the element interpolated off control electric charge information and corrects the on control electric charge information with the smoothed off control electric charge information, which has been subjected to the smoothing processing, or the smoothed element interpolated off control electric charge information, which has been subjected to the smoothing processing. With the modification described above, adverse effects of random noise are suppressed, and the radiation image signal with enhanced quality is acquired.

With the second radiation image processing apparatus in accordance with the present invention, the signal component is read out from the radiation detector, which comprises the plurality of the detection elements arrayed in the two-dimensional form, each of the detection elements being provided with the storage capacitor for storing the electric charge information in accordance with the radiation dose irradiated to the detection element, the radiation detector operating such that the readout on-off control is performed with respect to each of the rows in the array of the detection elements, and such that the electric charge information is read out through the identical signal line with respect to each of the columns in the array of the detection elements. At the time of the readout of the signal component, in cases where the continuous imaging operations are performed over the plurality of the frames, the on control electric charge information, which is obtained from the on-controlled detection element, is acquired with respect to each of the frames, and the off control electric charge information, which corresponds to the on-controlled detection element, is acquired by being thinned out with respect to each of the predetermined frame intervals. The correction circuit forms the frame interpolated off control electric charge information representing the off control electric charge information, which has not been acquired during the readout operation, and which is obtained by performing the interpolating operation in accordance with the off control electric charge information having been acquired with respect to each of the predetermined frame intervals. Also, the correction circuit corrects the on control electric charge information with the corresponding off control electric charge information or the corresponding frame interpolated off control electric charge information. Therefore, the second radiation image processing apparatus in accordance with the present invention has the advantages over the conventional apparatus, in which the off control electric charge information is read out with respect to each of all frames, in that the period of time required for reading out the off control electric charge information becomes short to the extent of the thinning-out acquisition, and in that the radiation image signal is therefore acquired quickly.

With the modification of the second radiation image processing apparatus in accordance with the present invention, the correction circuit performs the smoothing processing on the off control electric charge information and the frame interpolated off control electric charge information and corrects the on control electric charge information with the smoothed off control electric charge information, which has been subjected to the smoothing processing, or the smoothed frame interpolated off control electric charge information, which has been subjected to the smoothing processing. With the modification described above, adverse effects of random noise are suppressed, and the radiation image signal with enhanced quality is acquired.

DESCRIPTION OF THE PREFERRED EMBODIMENTS

Figure 1:
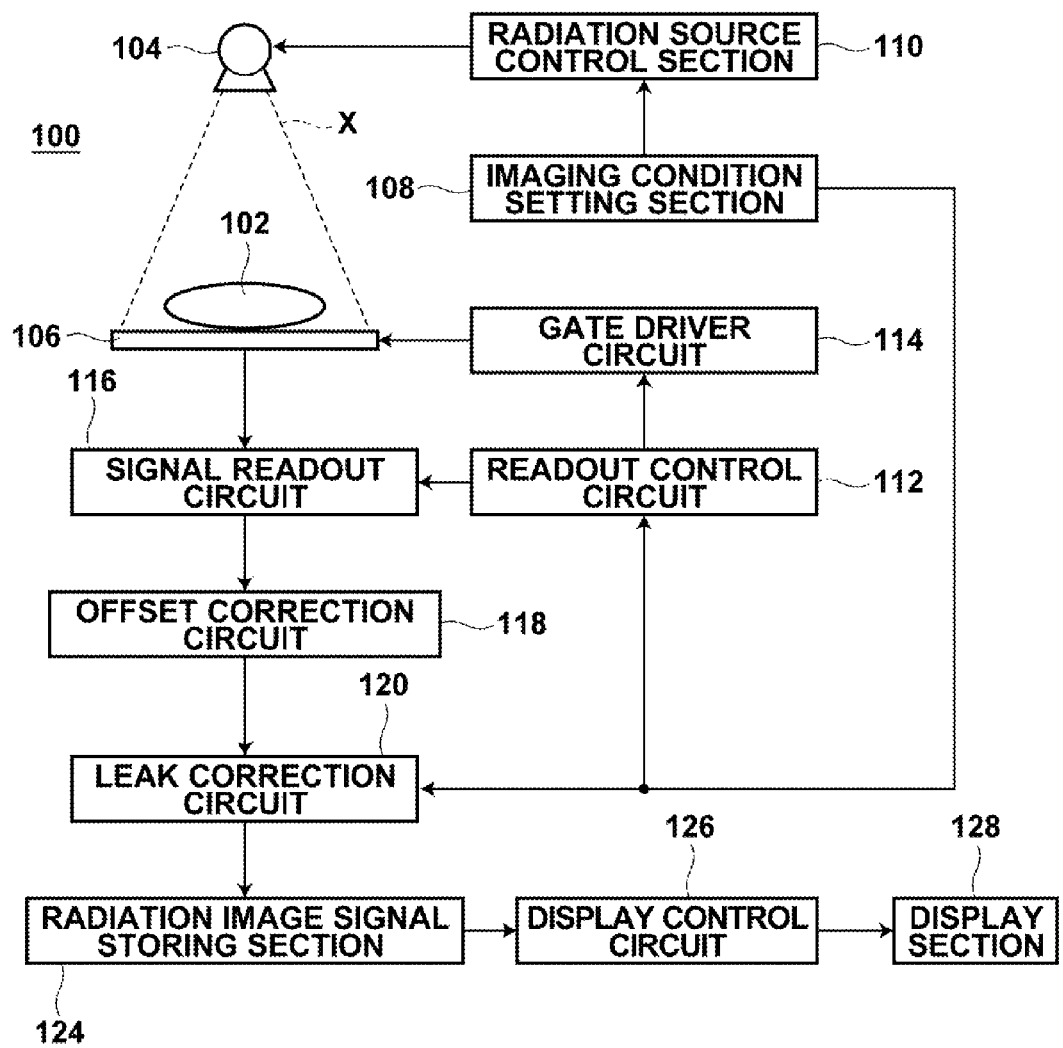
FIG. 1 is a schematic view showing a constitution of a first embodiment of the radiation image processing apparatus in accordance with the present invention.
Figure 2:
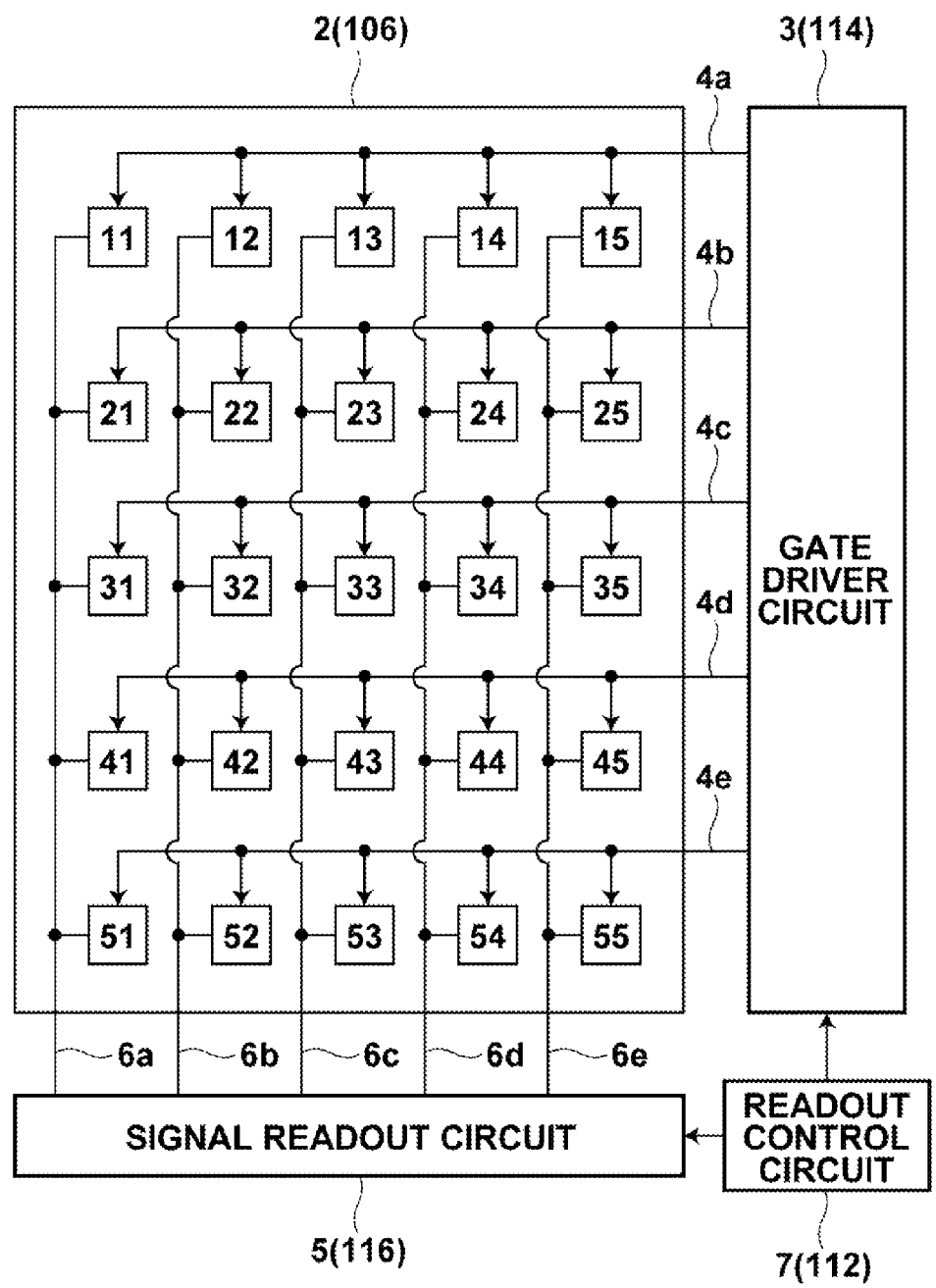
FIG. 2 is a schematic view showing a constitution of a radiation detector employed in the radiation image processing apparatus of FIG. 1.
Figure 3:
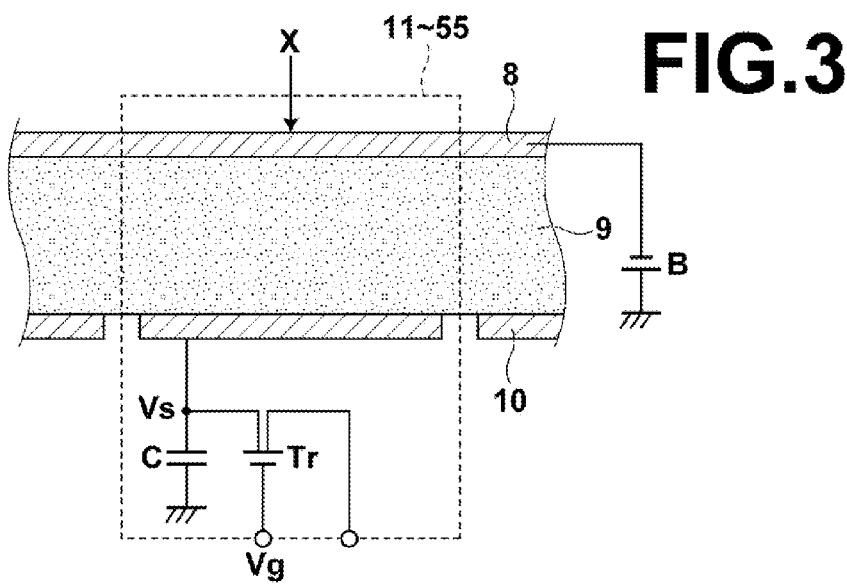
FIG. 3 is an explanatory view showing an equivalent circuit of each of detection elements constituting the radiation detector of FIG. 2.

The present invention will hereinbelow be described in further detail with reference to the accompanying drawings. FIG. 1 is a schematic view showing a constitution of a first embodiment of the radiation image processing apparatus in accordance with the present invention. FIG. 2 is a schematic view showing a constitution of a radiation detector employed in the radiation image processing apparatus of FIG. 1. FIG. 3 is an explanatory view showing an equivalent circuit of each of detection elements constituting the radiation detector of FIG. 2.

With reference to FIG. 1, a radiation image processing apparatus 100, which is the first embodiment of the radiation image processing apparatus in accordance with the present invention, comprises a radiation source 104 for irradiating radiation X toward an object 102. The radiation image processing apparatus 100 also comprises a radiation detector 106, which receives the radiation X carrying radiation image information of the object 102, and which detects the radiation image information of the object 102 as electric charge information. The radiation detector 106 has a constitution identical with the constitution of the radiation detector 2 shown in FIG. 2 and FIG. 3 and comprises the detection elements 11 to 55. The radiation detector 106 will be described hereinbelow also with reference to FIG. 2 and FIG. 3.

The radiation source 104 is controlled by a radiation source control section 110 in accordance with imaging conditions having been set by an imaging condition setting section 108.

As the imaging conditions, a tube voltage, a tube current, and a radiation X irradiation time are set in the radiation source 104 in accordance with a site of the object 102 to be imaged. As the imaging conditions, a radiation dose determined by the conditions described above, and a period of time elapsing between the finish of the irradiation of the radiation X and the beginning of the readout of the electric charge information from the radiation detector 106 are also set.

The radiation detector 106 is connected to a gate driver circuit 114 and a signal readout circuit 116. The gate driver circuit 114 and the signal readout circuit 116 are connected to a readout control circuit 112. The gate driver circuit 114 selects each of the gate lines 4a to 4e, which are connected to the corresponding detection elements arrayed in the direction of the row in the array of the detection elements 11 to 55 constituting the radiation detector 106, in accordance with a control signal given by the readout control circuit 112. The signal readout circuit 116 selects each of the signal lines 6a to 6e, which are connected to the corresponding detection elements arrayed in the direction of the column in the array of the detection elements 11 to 55 constituting the radiation detector 106, in accordance with a control signal given by the readout control circuit 112.

The signal readout circuit 116 is connected to an offset correction circuit 118. The offset correction circuit 118 corrects the electric charge information, which has been read out from each of the detection elements 11 to 55, by use of an offset signal component that is the electric charge information outputted from each of the detection elements 11 to 55 in the state, in which the radiation X is not irradiated to the radiation detector 106. The offset signal components corresponding to the detection elements 11 to 55 acquired previously before the imaging operation is performed.

The offset correction circuit 118 is connected to a leak correction circuit 120. The leak correction circuit 120 corrects the electric charge signal component (i.e., the on control electric charge information), which is obtained from each of the detection elements 11 to 55, by use of a leak electric charge signal component (i.e., the off control electric charge information).

The leak correction circuit 120 is connected to a radiation image signal storing section 124 for storing the corrected electric charge signal as the radiation image signal. The radiation image signal storing section 124 is connected to a display control circuit 126. The display control circuit 126 is connected to a display section 128. The display section 128 is controlled by the display control circuit 126 and displays the radiation image represented by the radiation image signal.

The radiation image processing apparatus 100, which is the first embodiment of the radiation image processing apparatus in accordance with the present invention, is basically constituted in the manner described above. The radiation image processing apparatus 100 operates in the manner described below.

Figure 4:
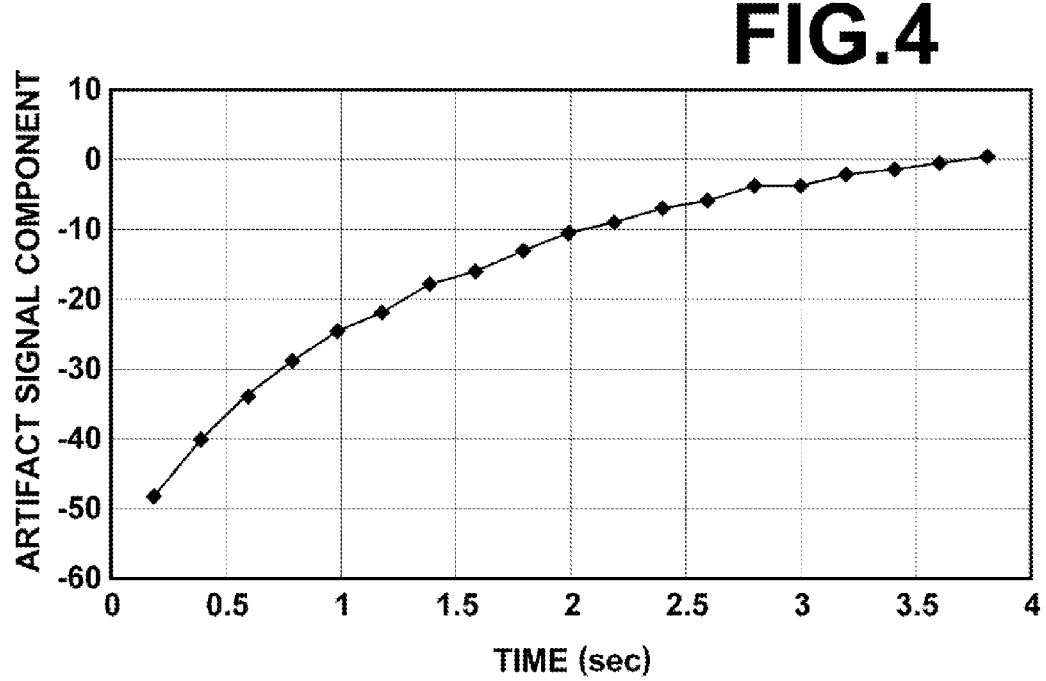
FIG. 4 is a graph showing characteristics of a change of a leak electric charge quantity with the passage of time at the time of an imaging operation for one screen on the radiation detector (irradiation at the time of 0 sec)

FIG. 4 is a graph showing characteristics of a change of a leak electric charge quantity with the passage of time at the time of an imaging operation for one screen on the radiation detector (irradiation at the time of 0 sec). Firstly, the imaging conditions are set by use of the imaging condition setting section 108. The imaging conditions include the tube voltage, the tube current, and the radiation X irradiation time, which are set in the radiation source 104 in accordance with the site of the object 102 to be imaged. The imaging conditions also include the radiation dose determined by the conditions described above, and the period of time elapsing between the finish of the irradiation of the radiation X and the beginning of the readout of the electric charge information from the radiation detector 106.

Thereafter, the radiation source control section 110 actuate the radiation source 104 in accordance with the imaging conditions having been set by the imaging condition setting section 108. The radiation X is irradiated to the object 102, and the imaging operation is thereby performed. The radiation X carrying the radiation image information of the object 102 is irradiated to each of the detection elements 11 to 55 constituting the radiation detector 106. When each of the detection elements 11 to 55 is thus exposed to the radiation X carrying the radiation image information of the object 102, positive and negative electric charges are generated in accordance with the radiation image information in each region of the conversion layer 9 constituted of a-Se, or the like, which region corresponds to one of the detection elements 11 to 55. Of the thus generated electric charges, the positive electric charges move toward the common electrode 8, to which a negative voltage is applied, and are thus recombined. Of the thus generated electric charges, the negative electric charges are collected by the pixel electrode 10 and stored in the storage capacitor C.

When the irradiation of the radiation X toward the object 102 in accordance with the imaging conditions having been set is finished, the readout control circuit 112 begins the acquisition of the radiation image signal from the radiation detector 106.

At the time at which the acquisition of the radiation image signal from the radiation detector 106 is begun, the transistor switch Tr constituting each of the detection elements 11 to 55 is in the off state. From this state, the readout control circuit 112 selects the gate line 4a via the gate driver circuit 114.

The gate driver circuit 114 applies the gate voltage Vg to the gate terminal of each of the detection elements 11 to 15, which are connected to the selected gate line 4a. The gate voltage Vg causes the transistor switch Tr constituting each of the detection elements 11 to 15 to transit to the on state. Also, the signal readout circuit 116 selects one of the transistor switches Tr, Tr, . . . constituting the detection elements 11 to 55 having been selected and reads out the electric charge signal component, which represents the negative electric charges having been stored in the storage capacitor C, as a Gate On signal component from the drain terminal of the selected transistor switch Tr. The offset correction circuit 118 corrects the Gate On signal component, which has thus been read out from the drain terminal of the selected transistor switch Tr, by use of the offset signal component that is the electric charge information outputted from the transistor switch Tr having been caused to transit to the on state. The offset signal component corresponding to the Gate On signal component is acquired previously by setting each of the detection elements 11 to 55 to the on state in the state, in which the radiation X is not irradiated to the radiation detector 106.

Thereafter, the gate driver circuit 114 causes the transistor switch Tr constituting each of the detection elements 11 to 15, which are connected to the selected gate line 4a, to transit to the off state. Also, the signal readout circuit 116 reads out the electric charge signal component, which is obtained immediately after the transistor switch Tr has thus been caused to transit to the off state, as a Gate Off signal component corresponding to each of the signal lines 6a to 6e with respect to the selected gate line 4a. The offset correction circuit 118 corrects the Gate Off signal component, which has thus been read out, by use of the offset signal component that is the electric charge information outputted from the transistor switch Tr having been caused to transit to the off state. The offset signal component corresponding to the Gate Off signal component is acquired previously by setting each of the detection elements 11 to 55 to the off state in the state, in which the radiation X is not irradiated to the radiation detector 106.

In the cases of the conventional apparatus, with respect to the transistor switch Tr constituting each of the detection elements connected to each gate line, in the order of the gate line 4b to the gate line 4e, the on state and the off state are changed over from each other, and the Gate On signal component and the Gate Off signal component are acquired for each of the gate lines. In contrast, in this embodiment of the radiation image processing apparatus 100 in accordance with the present invention, the Gate On signal component is acquired with respect to each of the gate lines, and the Gate Off signal component is acquired with respect to each of intervals of two gate lines. Specifically, in cases where the Gate Off signal component has been acquired with respect to the gate line 4a, the Gate Off signal component is then acquired with respect to each of the gate line 4c and the gate line 4e. The intervals of the acquisition of the Gate Off signal component are not limited to the intervals of the two gate lines and may be the intervals of three or more gate lines.

With respect to each of the gate lines, for which the Gate Off signal component has not been acquired, an interpolated Gate Off signal component is formed by performing an interpolating operation in accordance with the Gate Off signal components that have been acquired with respect to the gate lines adjacent to the gate line, for which the Gate Off signal component has not been acquired. In this embodiment, with respect to the gate line 4b, the interpolated Gate Off signal component is formed by performing the interpolating operation in accordance with the Gate Off signal components that have been acquired with respect to the gate line 4a and the gate line 4c. Also, with respect to the gate line 4d, the interpolated Gate Off signal component is formed by performing the interpolating operation in accordance with the Gate Off signal components that have been acquired with respect to the gate line 4c and the gate line 4e. In such cases, the interpolating operation may be a linear interpolating operation. Alternatively, the interpolating operation may be a non-linear interpolating operation, such as a spline interpolating operation.

Also, as illustrated in FIG. 4, the leak electric charge quantity (illustrated in FIG. 4 as an artifact signal component, which corresponds uniquely to the leak electric charge quantity) outputted from an identical signal line has the characteristics, such that the leak electric charge quantity attenuates with the passage of time and then converges at zero. Therefore, the interpolating operation may be performed with the aforesaid characteristics taken into consideration.

By the procedure described above, the Gate On signal components and the Gate Off signal components (including the interpolated Gate Off signal components) corresponding to one screen on the radiation detector 106 are acquired. A Gate On image signal and a Gate Off image signal corresponding to one image are thus formed. The Gate Off image signal representing the leak electric charge signal is then subtracted from the Gate On image signal, and an appropriate radiation image free from the artifact is thereby acquired.

At this time, smoothing processing, such as median filtering processing with respect to main and sub-scanning directions or moving-average processing, should preferably be performed on the Gate Off image signal. With the smoothing processing, adverse effects of random noise are suppressed.

With the constitution described above, the period of time required to acquire the Gate Off signal components is kept shorter than with the conventional apparatus. Therefore, the radiation image signal is acquired quickly.

Figure 5:
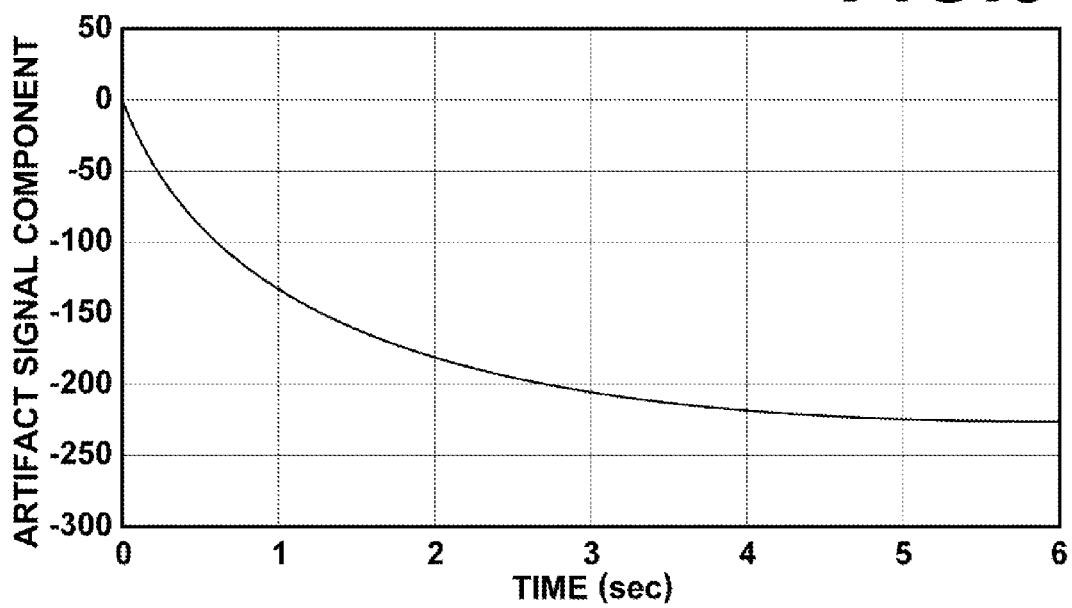
FIG. 5 is a graph showing characteristics of a change of a leak electric charge quantity with the passage of time at the time at which a predetermined dose of radiation is irradiated continuously to an ordinary radiation detector.

A second embodiment of the radiation image processing apparatus in accordance with the present invention will be described hereinbelow. FIG. 5 is a graph showing characteristics of a change of a leak electric charge quantity with the passage of time at the time at which a predetermined dose of radiation is irradiated continuously to an ordinary X-ray detector. The graph of FIG. 5 indicates that, in cases where the radiation is irradiated continuously to an ordinary TFT type X-ray detector, the leak electric charge quantity (illustrated in FIG. 5 as an artifact signal component, which corresponds uniquely to the leak electric charge quantity) outputted from an identical signal line has the characteristics, such that the leak electric charge quantity increases at the beginning of the irradiation and then reaches saturation at an approximately predetermined value with the passage of time.

In the second embodiment, in contrast to the aforesaid first embodiment wherein the acquisition of the Gate Off signal component is thinned out with respect to each of the gate line intervals, in cases where continuous imaging operations are performed over a plurality of frames, the acquisition of the Gate Off image signal is thinned out with respect to each of predetermined frame intervals. The term "Gate Off image signal" as used herein means the signal composed of the Gate Off signal components corresponding to one screen on the radiation detector 106.

The other features of the constitution of the second embodiment of the radiation image processing apparatus in accordance with the present invention are basically identical with the features of the constitution of the aforesaid first embodiment.

In the cases of the conventional apparatus, at the time at which the continuous imaging operations are performed over the plurality of the frames, the Gate On image signal and the Gate Off image signal are acquired with respect to each of the frames. In contrast, in the second embodiment of the radiation image processing apparatus in accordance with the present invention, the Gate On image signal is acquired with respect to each of the frames, and the Gate Off image signal is acquired with respect to each of intervals of two frames. Specifically, in cases where the Gate Off image signal has been acquired with respect to a first frame, the Gate Off image signal is then acquired with respect to each of a third frame, a fifth frame, a seventh frame, . . . . The intervals of the acquisition of the Gate Off image signal are not limited to the intervals of the two frames and may be the intervals of three or more frames.

With respect to each of the frames, for which the Gate Off image signal has not been acquired, an interpolated Gate Off image signal is formed by performing an interpolating operation in accordance with the Gate Off image signals that have been acquired with respect to the frames adjacent to the frame, for which the Gate Off image signal has not been acquired. In the second embodiment, with respect to a second frame, the interpolated Gate Off image signal is formed by performing the interpolating operation in accordance with the Gate Off image signals that have been acquired with respect to the first frame and the third frame. Also, with respect to a fourth frame, the interpolated Gate Off image signal is formed by performing the interpolating operation in accordance with the Gate Off image signals that have been acquired with respect to the third frame and the fifth frame. The interpolated Gate Off image signal is further formed in the same manner with respect to a sixth frame, an eighth frame, . . . . In such cases, the interpolating operation may be the linear interpolating operation. Alternatively, the interpolating operation may be the non-linear interpolating operation, such as the spline interpolating operation.

Also, for example, the imaging operations for acquiring an X-ray dynamic image of an object may be performed by irradiating a predetermined dose of the radiation from the X-ray source toward the object, and controlling on the side of the radiation detector such that the image is read out at predetermined time intervals (at fixed frame intervals). In the aforesaid imaging operations for acquiring the X-ray dynamic image, in cases where the continuous imaging operations are performed over the plurality of the frames, the timing, with which the Gate Off signal component is acquired, may be controlled by considering that, as illustrated in FIG. 5, the leak electric charge quantity (illustrated in FIG. 5 as the artifact signal component, which corresponds uniquely to the leak electric charge quantity) outputted from an identical signal line has the characteristics, such that the leak electric charge quantity increases with the passage of time and then reaches saturation at an approximately predetermined value with the passage of time. Specifically, at the stage immediately after the beginning of the imaging operation, the Gate Off signal component may be acquired at every stage after the Gate On signal component has been acquired. Thereafter, the intervals (the time intervals) of the acquisition of the Gate Off signal component may be controlled to be thinned out little by little. Also, at the time at which it is judged ultimately that the leak electric current has reached saturation perfectly, the acquisition of the Gate Off signal component may be ceased. With the control described above, the dynamic image of the object is acquired at a frame rate becoming higher with the passage of time from the beginning of the imaging operation (the irradiation). For performing the control described above, a system may be constituted such that the readout control circuit 112 illustrated in FIG. 1 is connected to a readout control condition storing section (not shown), which stores previously the information representing control methods that are determined by the radiation dose, the object to be imaged, the desired frame rate, the kind of a panel, and the like, and such that the control method is adjusted at the time of the setting of the imaging conditions and is performed. Further, in an imaging system for a dynamic image, in which the irradiation from the X-ray source is performed intermittently for each of desired frames, the control method may be adjusted previously in accordance with the decrease of the leak electric charge quantity as illustrated in FIG. 4 at the time, at which the X-rays are not irradiated, and the increase of the leak electric charge quantity as illustrated in FIG. 5 at the time, at which the X-rays are irradiated.

By the procedure described above, the Gate On image signal and the Gate Off image signal (including the interpolated Gate Off image signal) are acquired with respect to each of the frames. The Gate Off image signal or the interpolated Gate Off image signal representing the leak electric charge signal is then subtracted from the Gate On image signal with respect to each of the frames, and an appropriate radiation image free from the artifact is thereby acquired.

At this time, smoothing processing, such as median filtering processing with respect to main and sub-scanning directions or moving-average processing, should preferably be performed on the Gate Off image signal (including the interpolated Gate Off image signal). With the smoothing processing, adverse effects of random noise are suppressed.

Also, in cases where the imaging operation is performed continuously over the plurality of the frames, the leak electric charge quantity reaches saturation with the passage of time, and little change of the leak electric charge quantity then occurs. Therefore, during the continuous imaging operation, the frame intervals, at which the acquisition of the Gate Off image signal is thinned out, may be altered. For example, in the latter half of the continuous imaging operation, the frame intervals, at which the acquisition of the Gate Off image signal is thinned out, may be set to be larger.

With the constitution described above, the period of time required to acquire the Gate Off signal components is kept shorter than with the conventional apparatus. Therefore, the radiation image signal is acquired quickly.

The radiation image processing apparatus in accordance with the present invention is not limited to the first and second embodiments described above and may be embodied in various other ways.

For example, the first embodiment and the second embodiment may be combined with each other. Specifically, in cases where the continuous imaging operation is performed over the plurality of the frames, the acquisition of the Gate Off signal component may be thinned out with respect to each of the predetermined frame intervals, and the acquisition of the Gate Off signal component may be thinned out with respect to each of the predetermined gate line intervals as for the frame for which the acquisition of the Gate Off signal component is performed.

Further, besides the foregoing, various improvements and modifications may be made without departing from the spirit and scope of the invention.

What is claimed is:

1. A radiation image processing apparatus, comprising:
   i) a radiation detector, which comprises a plurality of detection elements arrayed in a two-dimensional form, each of the detection elements being provided with a storage capacitor for storing electric charge information in accordance with a radiation dose irradiated to the detection element, the radiation detector operating such that readout on-off control is performed with respect to each of rows in the array of the detection elements, and such that the electric charge information is read out through an identical signal line with respect to each of columns in the array of the detection elements,
   ii) a driver circuit for performing the readout on-off control with respect to each of the rows in the array of the detection elements,
   iii) a readout circuit for reading out a signal component having been outputted through the signal line with respect to each of the columns in the array of the detection elements,
   iv) control means for controlling the driver circuit and the readout circuit, such that on control electric charge information, which is obtained from an on-controlled detection element, is acquired with respect to each of the detection elements, and such that off control electric charge information, which corresponds to the on-controlled detection element, is acquired with respect to each of predetermined detection element intervals, and
   v) a correction circuit for:
   forming element interpolated off control electric charge information representing the off control electric charge information, which has not been acquired during the readout operation, and which is obtained by performing an interpolating operation in accordance with the off control electric charge information having been acquired with respect to each of the predetermined detection element intervals, and
   correcting the on control electric charge information with the corresponding off control electric charge information or the corresponding element interpolated off control electric charge information.

2. A radiation image processing apparatus as defined in claim 1 wherein the correction circuit performs smoothing processing on the off control electric charge information and the element interpolated off control electric charge information and corrects the on control electric charge information with the smoothed off control electric charge information, which has been subjected to the smoothing processing, or the smoothed element interpolated off control electric charge information, which has been subjected to the smoothing processing.

3. A radiation image processing apparatus, comprising:
   i) a radiation detector, which comprises a plurality of detection elements arrayed in a two-dimensional form, each of the detection elements being provided with a storage capacitor for storing electric charge information in accordance with a radiation dose irradiated to the detection element, the radiation detector operating such that readout on-off control is performed with respect to each of rows in the array of the detection elements, and such that the electric charge information is read out through an identical signal line with respect to each of columns in the array of the detection elements,
   ii) a driver circuit for performing the readout on-off control with respect to each of the rows in the array of the detection elements,
   iii) a readout circuit for reading out a signal component having been outputted through the signal line with respect to each of the columns in the array of the detection elements,
   iv) control means for controlling the driver circuit and the readout circuit at the time of continuous imaging operations performed over a plurality of frames, such that on control electric charge information, which is obtained from an on-controlled detection element, is acquired with respect to each of the frames, and such that off control electric charge information, which corresponds to the on-controlled detection element, is acquired with respect to each of predetermined frame intervals, and
   v) a correction circuit for:
   forming frame interpolated off control electric charge information representing the off control electric charge information, which has not been acquired during the readout operation, and which is obtained by performing an interpolating operation in accordance with the off control electric charge information having been acquired with respect to each of the predetermined frame intervals, and
   correcting the on control electric charge information with the corresponding off control electric charge information or the corresponding frame interpolated off control electric charge information.

4. A radiation image processing apparatus as defined in claim 3 wherein the correction circuit performs smoothing processing on the off control electric charge information and the frame interpolated off control electric charge information and corrects the on control electric charge information with the smoothed off control electric charge information, which has been subjected to the smoothing processing, or the smoothed frame interpolated off control electric charge information, which has been subjected to the smoothing processing.

* * * * *